(12) United States Patent
Babian et al.

(10) Patent No.: US 7,805,815 B2
(45) Date of Patent: Oct. 5, 2010

(54) CLIP

(75) Inventors: Philip Joseph Babian, Canton, MI (US); Paxton S. Williams, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 512 days.

(21) Appl. No.: 11/843,444

(22) Filed: Aug. 22, 2007

(65) Prior Publication Data

US 2009/0049660 A1    Feb. 26, 2009

(51) Int. Cl.
*F16B 5/06*    (2006.01)
*B62D 25/08*    (2006.01)

(52) U.S. Cl. .............................. 24/295; 24/297; 24/458; 296/96.21; 296/201; 296/192

(58) Field of Classification Search ........................ None
See application file for complete search history.

(56) References Cited

U.S. PATENT DOCUMENTS

| | | | |
|---|---|---|---|
| 2,137,883 | A | 11/1938 | Ross |
| 5,667,271 | A | 9/1997 | Booth |
| 5,685,598 | A | 11/1997 | Inoue et al. |
| 5,762,397 | A | 6/1998 | Venuto et al. |
| 6,074,150 | A | 6/2000 | Shinozaki et al. |
| 6,132,154 | A | 10/2000 | Easter et al. |
| 6,439,652 | B2 | 8/2002 | Fujita et al. |
| 6,517,145 | B2 | 2/2003 | Hedderly |
| 6,520,566 | B2 | 2/2003 | Kim et al. |
| 7,182,397 | B1 | 2/2007 | Desai |

(Continued)

FOREIGN PATENT DOCUMENTS

JP    2175473    7/1990

(Continued)

*Primary Examiner*—Jack W. Lavinder
(74) *Attorney, Agent, or Firm*—Gifford, Krass, Sprinkle, Anderson & Citkowski, P.C.

(57) ABSTRACT

The present invention discloses a clip for attaching an object to a sheet having an aperture spaced apart from a leading edge of the sheet. The clip includes a base with a generally planar lower member, the lower member having a leading edge and a trailing edge. The base also has a generally planar upper member extending across the lower member, the upper member also having a leading edge, a trailing edge and an opening between the upper member leading edge and trailing edge. The trailing edge of the upper member is attached to and extends from the base proximate the trailing edge of the lower member. The upper member also includes a spring located proximate to the trailing edge of the upper member and extending into the opening in a generally leading edge direction. The finger spring is operable to apply a force in a generally leading edge direction onto a sheet edge of a sheet inserted and located between the lower member and the upper member. The upper member can include a catch stem located proximate to the leading edge of the upper member yet oppositely disposed across from the opening from the finger spring. The catch stem extends into the opening in a generally trailing edge direction and is operable to catch a sheet edge of the sheet bounding the aperture spaced apart from the leading edge of the sheet and thereby preventing removal of the clip from the sheet.

16 Claims, 2 Drawing Sheets

U.S. PATENT DOCUMENTS

| | | |
|---|---|---|
| 7,188,393 B2 | 3/2007 | Kawai et al. |
| 7,198,315 B2 | 4/2007 | Cass et al. |
| 7,401,388 B2 * | 7/2008 | Hansen .................. 24/297 |
| 2001/0022923 A1 | 9/2001 | Arisaka |

FOREIGN PATENT DOCUMENTS

| | | |
|---|---|---|
| JP | 9156431 | 6/1997 |
| JP | 2001030955 | 2/2001 |
| JP | 2006082675 | 3/2006 |

* cited by examiner

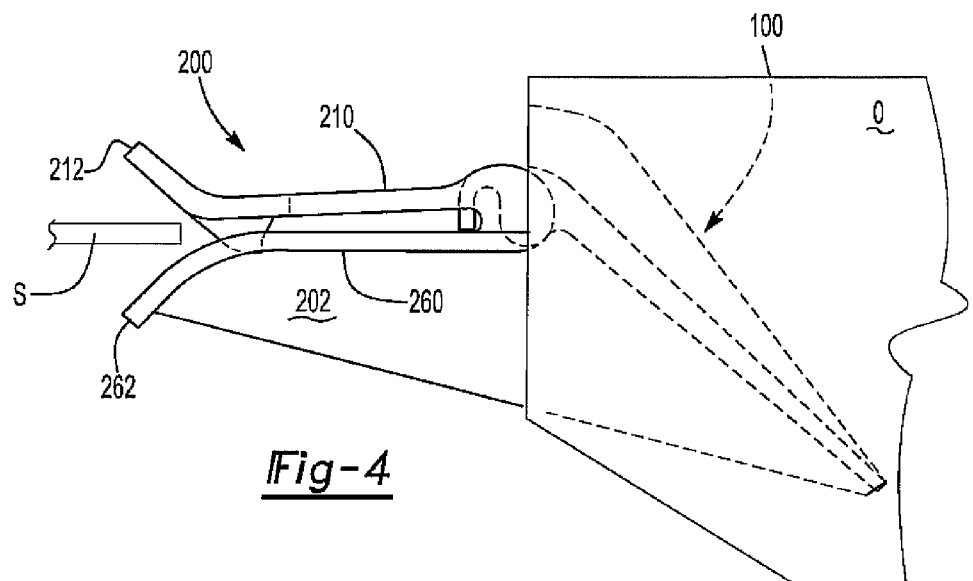
Fig-4
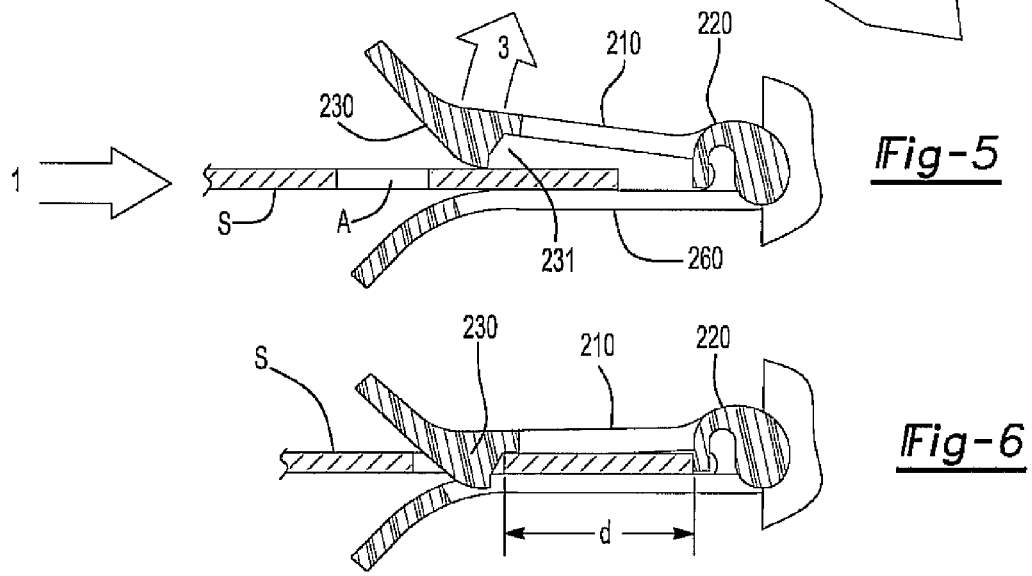
Fig-5
Fig-6
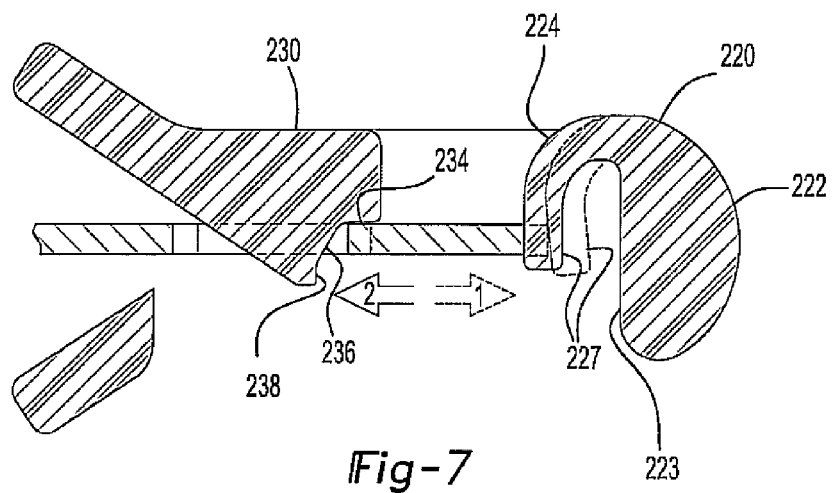
Fig-7

CLIP

FIELD OF THE INVENTION

This invention relates generally to a clip. More specifically, the invention relates to a clip with a variable retention system.

BACKGROUND OF THE INVENTION

A clip is generally used as a device for attaching one object to another. As such, clips have a multitude of uses and applications in a variety of industries. In the automotive industry, clips are used to attach various components of the interior of a motor vehicle to the frame and other support structures. For example, the instrument panel of a motor vehicle uses a clip to attach the panel to the cowl during assembly. Such a clip generally has one end that attaches to the instrument panel and another end that attaches to the cowl. The cowl, which is typically manufactured from sheet metal, will generally have a series of apertures that are spaced apart from the leading edge of the sheet metal, the aperture providing an attachment point for the clip. The clip is slid onto the sheet metal until a catch stem falls into place within the aperture, the catch stem preventing the clip and the attached instrument panel from being removed. Although such clips work well for attaching the instrument panel to the cowl, vibration noise, also referred to as rattling, can be experienced between the cowl, the clip and the instrument panel when the motor vehicle travels on a rough road. As such, a clip with a variable retention system that affords for a tight and vibration noise-free fit between two objects attached to one another would be desirable.

SUMMARY OF THE INVENTION

The present invention discloses a clip for attaching an object to a sheet, the sheet having an aperture spaced apart from a leading edge of the sheet. The clip includes a base with a generally planar lower member, the lower member having a leading edge and a trailing edge. The base also has a generally planar upper member extending across the lower member, the upper member also having a leading edge, a trailing edge and an opening. The opening is located between the leading edge and trailing edge of the upper member. The trailing edge of the upper member is attached to and extends from the base proximate the trailing edge of the lower member.

The upper member also includes a finger spring that has a generally U-shaped elastic element the finger spring located proximate to the trailing edge of the upper member and extending into the opening in a direction from the trailing edge towards the leading edge. The finger spring is operable to apply a continuous force against the leading edge of the sheet inserted and located between the lower member and the upper member. The force is applied in a direction towards the leading edge of the upper member.

The upper member also includes a catch stem located proximate to the leading edge of the upper member yet oppositely disposed across from the opening from the finger spring. The catch stem extends into the opening in a generally trailing edge direction and has a catch notch that faces the finger spring. In an embodiment of the present invention, the catch notch has a first surface that is generally parallel to the sheet located between the lower member and the upper member, a stop surface, and a cam surface extending from the first surface to the stop surface. The catch notch is operable to catch upon a sheet edge bounding an aperture within the sheet and thereby prevent removal of the sheet from the clip. The combination of the force applied against the leading edge of the sheet placed between the lower member and upper member of the clip and the catch notch affords for a variable retention system that prevents vibration noise between the sheet and the clip.

BRIEF DESCRIPTION OF THE DRAWINGS

FIG. 4 is a side view of the embodiment shown in FIG. 2;

FIG. 5 is a cross-sectional side view of an embodiment of the present invention wherein a sheet is illustrated being inserted between a generally planar upper member and a generally planar lower member of a clip;

FIG. 6 is a cross-sectional side view of an embodiment of the present invention wherein a sheet has been inserted between a generally planar upper member and a generally planar lower member of a clip and locked in place; and FIG. 7 is a cross-sectional side view of an embodiment of the present invention demonstrating with a variable retention system.

DETAILED DESCRIPTION OF THE PREFERRED EMBODIMENTS

The present invention discloses a clip that can be used to attach two objects to one another. As such, the present invention has utility as a clip and/or an attachment device.

The clip of the present invention includes a variable retention system that affords for constant tension to be applied between the clip and a sheet placed therein. The constant tension applied to the sheet prevents vibration and/or rattling therebetween. The present invention uses a finger spring to apply tension to the leading edge of the sheet inserted within the clip and can include a catch mechanism that prevents the clip from being removed.

Figure 1:
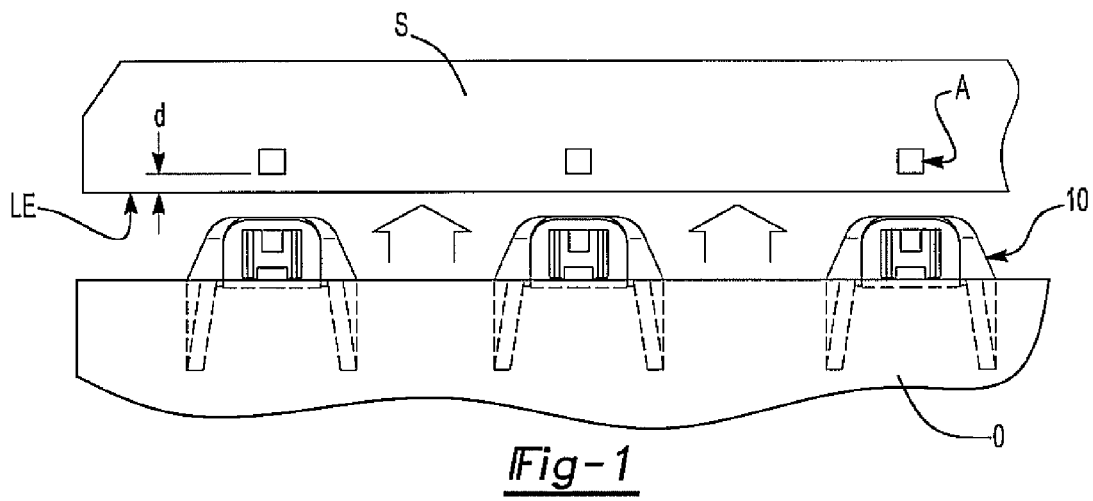
FIG. 1 is a top view showing an object being attached to a sheet using an embodiment of the present invention.

Referring now to FIG. 1, there is shown an embodiment of the present invention wherein an object O is attached to the clip 10, and the clip 10 is to be slid upon and attached to a sheet S. The sheet S has an aperture A that is spaced apart from the leading edge LE of the sheet S by a dimension d. Such a type of attachment between two objects is employed in a variety of industries and different locations within a motor vehicle. For example, an instrument panel for a motor vehicle can be attached to the cowl using such a clip.

Figure 2:
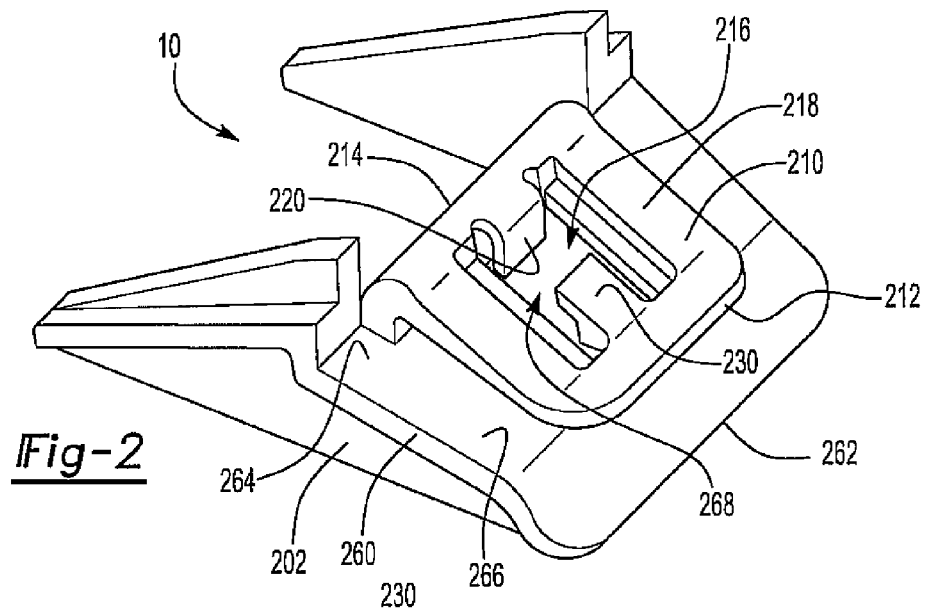
FIG. 2 is a perspective view of an embodiment of the present invention.
Figure 3:
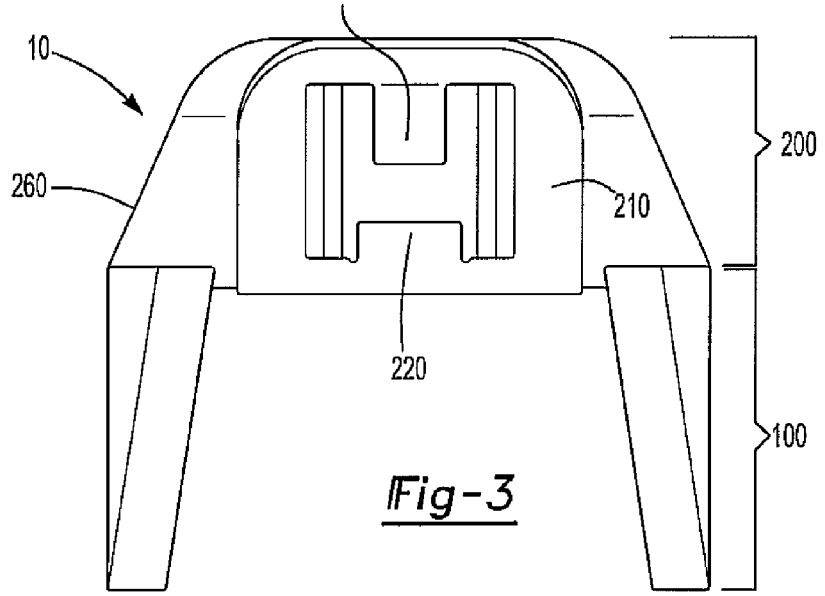
FIG. 3 is a top view of the embodiment shown in FIG. 2.

Turning now to FIGS. 2 and 3, a perspective view and top view are shown for an embodiment of the present invention. The embodiment illustrated in these figures includes a clip 10 with an object end 100 and a sheet end 200. The object end 100 is operable to attach to an object, for example an instrument panel, and is designed and shaped for its intended purpose. It is appreciated that in the figures herein, the object end includes a generally V-shaped ramp that can be inserted within the object O. However, the scope of the present invention is not limited to this type of design and other shapes, structures and designs can be used.

Looking specifically now at the sheet end 200, a base 202 with a generally planar lower member 260 and a generally planar upper member 210 can be included. The lower member 260 can include a leading edge 262 and a trailing edge 264. The lower member extends from the object end 100 and the leading edge 262 can be inclined at an angle relative to a flat section 266 of the lower member 260. In the alternative, the leading edge 262 is not inclined at an angle from the flat section 266. The lower member 260 can optionally include an opening 268.

The upper member 210 has a leading edge 212 and a trailing edge 214. The trailing edge 214 is attached proximate the trailing edge 264 of the lower member 260. The upper member 210 extends across the lower member 260 and has an opening 216. The leading edge 212 can be inclined at an angle from a generally flat section 218 of the upper member 210. In the alternative, the leading edge 212 is not inclined at an angle from the flat section 218. In some instances, the trialing edge 214 attaches to the lower member 260, however this is not required for the enablement of the present invention. What is required is two generally planar members between which a sheet can be placed.

Including now FIGS. 4-7, a finger spring 220 and a catch stem 230 are illustrated. The finger spring 220 is attached to the upper member 210 proximate the trailing edge 214. The finger spring 220 can be a generally U-shaped elastic member that extends into the opening 216 in a direction towards the leading edge 212. As illustrated in FIG. 7, the finger spring 220 includes a spring element 224 attached to a base 222, the spring element 224 operable to be compressed or pushed in a first direction I by the sheet S inserted between the upper member 210 and the lower member 260. The movement of the spring element 224 in the first direction I places the element 224 in a compressive position. In response to the compressive force applied to the spring element 224, an opposite force is applied to the sheet S in a second direction 2. In some embodiments of the present invention, the spring element 224 has a rear face 227 and the base 222 has a front face 223. The rear face 227 of the spring element 224 and the front face 223 of the base 222 afford for a generally U-shaped structure, however any shaped structure that affords for continuous force to applied against the leading edge LE of the sheet S in a second direction 2 can be used. The application of force by the finger spring 220 onto the leading edge LE in the second direction 2 provides a constant tension onto the sheet S.

Oppositely disposed across the opening 216 from the finger spring 220 is the catch stem 230. The catch stem 230 includes a catch notch 231 which faces the finger spring 220. In an embodiment of the present invention the catch notch 231 includes a first surface 234, a cam surface 236 and a stop surface 238. The first surface 234 can be generally parallel to the sheet S inserted between the upper member 210 and the lower member 260 as illustrated in FIGS. 6 and 7. The cam surface 236 extends from the first surface 234 to the stop surface 238 and in some instances extends from the first surface 234 at an obtuse angle. In addition, the stop surface 238 can extend from the cam surface 236 at an obtuse angle. The incline of the cam surface 236 relative to the sheet edge bounding the aperture A of the sheet S and the spring finger 220 affords for variable adjustment for the location of the clip 10 with respect to the sheet S that is between the leading edge LE and the aperture A. In other embodiments, the catch notch 231 does not have a cam surface 236, but rather has a stop surface 238 extending from the first surface 234.

Looking specifically at FIGS. 4-6, a typical sequence is illustrated wherein the sheet S is inserted between the upper member 210 and the lower member 260. As the sheet S enters the clip 10 moving in a first direction I, the sheet between the leading edge LE and the aperture A passes underneath the catch stem 230 as the upper member 210 moves in a third direction 3. After the sheet S has passed the distance d beyond the stop surface 238, the catch notch 231 and catch stem 230 seek to return to their original position and enter at least partially the aperture A. Once the spring notch 231 has entered into the aperture A, the notch prevents the sheet S from moving back in a second direction 2. In addition, the spring element 224 applies a continuous force on the leading edge LE of the sheet S in the second direction 2 and thereby affords for the prevention of vibration between the sheet S and the clip 10 that can cause vibration noise when the motor vehicle containing the object O, the clip 10, and the sheet S travels on a rough road.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A clip for attaching to a sheet, the sheet having an aperture spaced apart from a leading edge of the sheet, said clip comprising:
   a generally planar lower member, said lower member having a leading edge and a trailing edge;
   a generally planar upper member extending across said lower member, said upper member having a leading edge, a trailing edge and an opening between said leading edge and said trailing edge;
   said trailing edge of said upper member attached to and extending from said lower member proximate said trailing edge of said lower member;
   said upper member having:
      a spring proximate said trailing edge of said upper member and extending into said opening in a direction from said trailing edge to said leading edge, said spring operable to apply a force against the leading edge of the sheet located between said lower member and said upper member; and
      a catch stem proximate said leading edge of said upper member and having a catch notch facing said spring, oppositely disposed across said opening from said spring and extending into said opening in a direction from said leading edge to said trailing edge, said catch notch having a first surface generally parallel to the sheet located between said lower member and said upper member, a stop surface and a cam surface extending from said first surface to said stop surface, said catch notch operable to catch upon a sheet edge bounding the aperture spaced apart from the leading edge of the sheet located between said lower member and said upper member and prevent the sheet from being removed from the clip.

2. The clip of claim 1, wherein said spring is a finger spring having a generally U-shape with an elastic finger element extending into said opening between said trailing edge and said leading edge.

3. The clip of claim 2, wherein said elastic element extends into said opening in a direction from said trailing edge to said leading edge.

4. The clip of claim 2, wherein said finger spring has a base and an elastic finger element extending from said base into said opening between said trailing edge and said leading edge.

5. The clip of claim 4, wherein said elastic finger element extends into said opening in a direction from said trailing edge to said leading edge.

6. The clip of claim 1, wherein said cam surface extends from said first surface at an obtuse angle.

7. The clip of claim 6, wherein said stop surface extends from said cam surface in a direction generally perpendicular to the sheet located between said lower member and said upper member.

8. A clip for attaching to a sheet, the sheet having an aperture spaced apart from a leading edge of said sheet, said clip comprising:
   a base having a generally planar lower member, said lower member having a leading edge and a trailing edge;
   said base also having a generally planar upper member extending across said lower member, said upper member having a leading edge, a trailing edge and an opening between said leading edge and said trailing edge;
   said trailing edge of said upper member attached to and extending from said base proximate said trailing edge of said lower member;
   said upper member further comprising:
      a finger spring having a generally U-shaped elastic element proximate said trailing edge of said upper member and extending into said opening in a direction from said trailing edge to said leading edge, said finger spring operable to apply a force against the leading edge of the sheet located between said lower member and said upper member proximate said trailing edge of said upper member; and
      a catch stem proximate said leading edge of said upper member, oppositely disposed across said opening from said finger spring and extending into said opening in a direction from said leading edge to said trailing edge;
   said catch stem having a catch notch facing said finger spring, said catch notch having a first surface generally parallel to a sheet located between said lower member and said upper member, a stop surface and a cam surface extending from said first surface to said stop surface, said catch notch operable to catch upon a sheet edge of the sheet having an aperture spaced apart from the leading edge and located between the lower member and the upper member.

9. A clip for attaching an instrument panel to a cowl in a motor vehicle when the cowl has an aperture spaced apart from a leading edge of the cowl, said clip comprising:
   an instrument panel end operable to attach to the instrument panel of the motor vehicle;
   a cowl end having a base extending from said instrument panel end, said base having a generally planar lower member, said lower member having a trailing edge;
   said base also having a generally planar upper member extending across said lower member, said upper member having a leading edge, a trailing edge and an opening between said leading edge and said trailing edge;
   said trailing edge of said upper member attached to and extending from said base proximate said instrument panel end;
   said upper member having:
      a spring proximate said trailing edge of said upper member and extending into said opening in a direction from said trailing edge to said leading edge, said spring operable to apply a force against the leading edge of the sheet located between said lower member and said upper member; and
      a catch stem having a catch notch proximate said leading edge of said upper member, facing said spring, oppositely disposed across said opening from said spring and extending into said opening in a direction from said leading edge to said trailing edge, said catch notch having a first surface generally parallel to the sheet located between said lower member and said upper member, a stop surface and a cam surface extending from said first surface to said stop surface, said catch notch operable to catch upon a sheet edge bounding the aperture spaced apart from the leading edge of the sheet located between said lower member and said upper member and prevent the sheet from being removed from the clip.

10. The clip of claim 9, wherein said spring is a finger spring having a generally U-shape with an elastic element extending into said opening between said trailing edge and said leading edge.

11. The clip of claim 10, wherein said elastic element extends into said opening in a direction from said trailing edge to said leading edge.

12. The clip of claim 10, wherein said finger spring has a base and an elastic finger element extending from said base into said opening between said trailing edge and said leading edge.

13. The clip of claim 12, wherein said elastic finger element extends into said opening in a direction from said trailing edge to said leading edge.

14. The clip of claim 9, wherein said cam surface extends from said first surface at an obtuse angle.

15. The clip of claim 14, wherein said stop surface extends from said cam surface in a direction generally perpendicular to the sheet located between said lower member and said upper member.

16. A clip for attaching to a sheet, the sheet having an aperture spaced apart from a leading edge of the sheet, said clip comprising:
   a generally planar lower member;
   a generally planar upper member having an opening and extending across said lower member;
   said upper member having a spring and a catch stem extending into said opening, said spring operable to apply a force against the leading edge of the sheet back towards said catch stem when the sheet is attached to the clip and located between said lower member and said upper member; and
   said catch stem operable to catch upon a sheet edge bounding the aperture spaced apart from the leading edge of the sheet located between said lower member and said upper member and prevent the sheet from being removed from the clip.

* * * * *

UNITED STATES PATENT AND TRADEMARK OFFICE
CERTIFICATE OF CORRECTION

PATENT NO.        : 7,805,815 B2                          Page 1 of 1
APPLICATION NO.   : 11/843444
DATED             : October 5, 2010
INVENTOR(S)       : Philip Joseph Babian et al.

It is certified that error appears in the above-identified patent and that said Letters Patent is hereby corrected as shown below:

Column 3, line 24 replace the letter "l" with the number --1--

Column 3, line 26 replace the letter "l" with the number --1--

Column 3, line 61 replace the letter "l" with the number --1--

Signed and Sealed this

Seventeenth Day of May, 2011

David J. Kappos
*Director of the United States Patent and Trademark Office*